Dec. 10, 1963   K. W. EDMARK, JR   3,113,586
ARTIFICIAL HEART VALVE
Filed Sept. 17, 1962

INVENTOR.
KARL W. EDMARK, JR.
BY Herman L. Gordon
ATTORNEY

— Page header omitted —

3,113,586
ARTIFICIAL HEART VALVE
Karl W. Edmark, Jr., Seattle, Wash., assignor to Physio-Control Company, Inc., Seattle, Wash., a corporation of Delaware
Filed Sept. 17, 1962, Ser. No. 224,025
10 Claims. (Cl. 137—512.1)

This invention relates to iris valves, and more particularly to an artificial heart valve of the iris type adapted to be substituted for a defective or diseased vascular valve by surgical procedure.

A main object of the invention is to provide a novel and improved artificial heart valve which is relatively simple in construction, which is easy to install, which minimizes blood clotting, and which will operate efficiently for long periods of time.

A further object of the invention is to provide an improved valve of the iris type which is especially suitable for use as an artificial heart valve to replace a defective valve, the improved valve being relatively compact in size, imposing minimum resistance to flow when it is open, opening and closing with minimum frictional rubbing of its cooperating flaps, forming an effective seal when closed, and being provided with flaps having a configuration such that the flaps are adequately supported at their margins when they are in closed positions and being arranged so that they are opened without excessive deformation thereof.

A still further object of the invention is to provide an improved artificial heart valve adapted to be used as a replacement for a defective heart valve in vascular surgical procedure, the improved artificial valve being of the iris type and comprising cooperating flaps or cusps which are shaped so that they support each other in their interlocked closed positions but which are free to open, with minimum mutual interference, responsive to vascular flow, and which, when opened, permit smooth and nearly laminar flow of blood therepast, reducing the chance of blood clotting (thrombus formation), whereby the valve will function smoothly and efficiently for years after it has been installed in place of a diseased heart valve.

A still further object of the invention is to provide an improved artificial heart valve for use in vascular surgery, the improved valve being relatively simple in design and differing significantly from the normal human aortic or pumonic valve in that it does not include deep cusps supported from a wall which balloons out when closed, and which differs significantly from the normal mitral or tricuspid valve in that papillary musculature and chordaetendenae are not required to support the edges of the cusps in the closed position to prevent inversion of the cusps and incompetency of the valve, the improved artificial valve requiring practically no deformation of its cusps during opening.

Further objects and advantages of the invention will become apparent from the following description and claims, and from the accompanying drawings, wherein:

Figure 1:
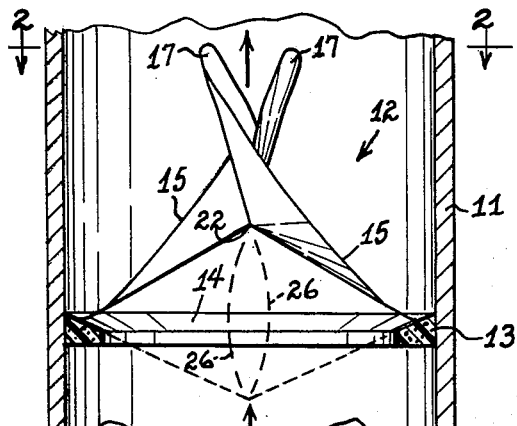
FIGURE 1 is a vertical cross-sectional view taken through a vascular conduit in which is installed an improved artificial heart valve constructed in accordance with the present invention, the valve being shown in open position.
Figure 2:
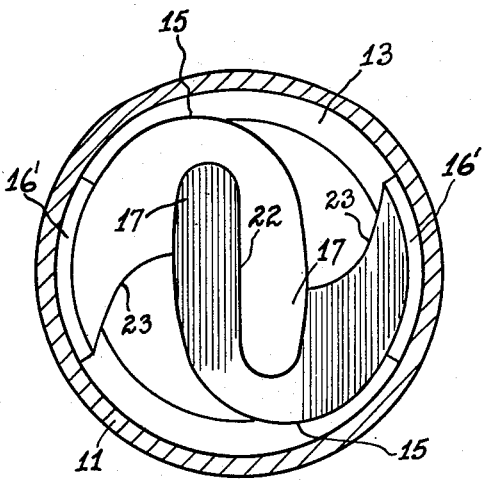
FIGURE 2 is a cross-sectional view taken substantially on the line 2—2 of FIGURE 1.

Referring to the drawings, 11 generally designates a vascular conduit, and 12 designates an artificial valve constructed in accordance with the present invention, said valve being installed in the conduit as a substitute for a defective or diseased original vascular valve to control the flow of blood through the conduit. The required flow is in the direction indicated by the axial arrows in FIGURE 1, namely, in an upward direction as viewed in said figure.

The artificial valve 12 comprises an annular supporting seat 13 which is secured in any suitable manner inside the vascular conduit 11 and which is of sufficient rigidity to maintain a substantially circular shape. The upper face 14 of the annular member 13 is of frusto-conical, downwardly convergent shape.

Figure 3:
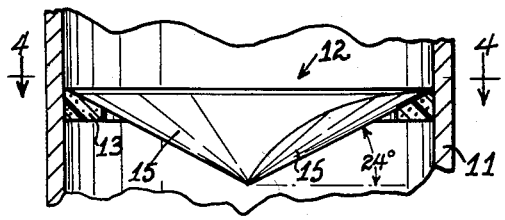
FIGURE 3 is a vertical cross-sectional view similar to FIGURE 1 but showing the valve in closed position.

Secured at substantially diametrically opposite areas on the upper face of annular member 13 are the cooperating conical cusp or flap members 15, 15, said members being shaped in a manner presently to be described, so that they overlap and can flex upwardly and downwardly with practically no rubbing friction between the positions shown in FIGURES 3 and 1. In the position of FIGURE 3, the cusps overlap and mutually support each other at their inner marginal portions and rest on the frusto-conical face 14 at their outer marginal portions, the configurations of the cusps being such that they define a downwardly converging cone. As shown in FIGURE 3, the inclination of an element of the cone to the horizontal is preferably about 24°. The cusps are provided with arcuate attachment tabs 16' at their outer margins which are secured to the upper portions of the face 14, the cusps being relatively flexible adjacent said tabs so that they can easily flex upwardly responsive to pulsations of flow. Thus, the cusps can be flexed upwardly from the closed position of FIGURE 3 to the open position of FIGURE 1 to allow flow in the upward direction, as viewed in FIGURES 1 and 3. Upon decay of each pulsation, the cusps return to their closed positions, shown in FIGURE 3.

The cusps 15 are made of suitable durable material, such as plastic-impregnated paper, fabric, or other sheet material, having substantial stiffness at their inner conical portions, but flexing easily adjacent their outer margins.

Figure 5:
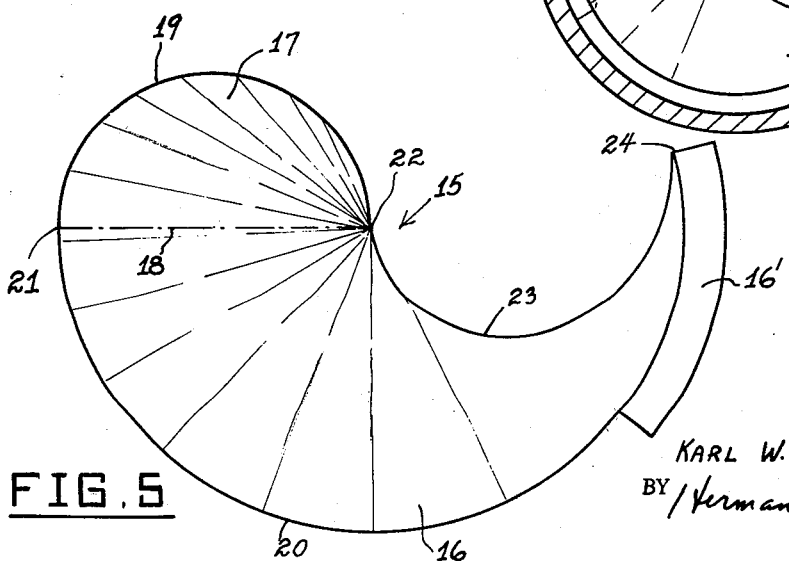
FIGURE 5 is an enlarged top plan view of one of the flaps or cusps of the artificial heart valve illustrated in FIGURES 1 to 4.

As shown in FIGURE 5, each cusp 15 comprises a main lobe 16 which is generally semi-circular in plan and terminates in an end lobe 17, also generally semi-circular in plan, having a diameter about one half that of the main lobe, namely, having a diameter comprising an element 18 of the cone on which the cusp is formed. The semi-circular edge 19 of lobe 17 merges at its outer end with the outer end of the semi-circular edge 20 of main lobe 16 (at 21), and extends at its inner end to the vertex 22 of the cone. The cusp is formed with a generally semi-circular arcuate notch 23 extending from the vertex 22 to the attached end 24 of the main lobe 16. The securing tab 16' extends a substantial distance along the edge of main lobe 16 from end 24 thereof, and may be of any suitable arcuate length.

Figure 4:
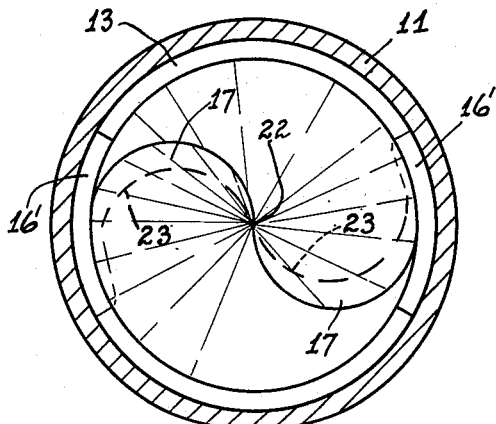
FIGURE 4 is a cross-sectional view taken substantially on the line 4—4 of FIGURE 3.

The main lobe 16 is somewhat larger than a semi-circle, as shown in FIGURE 5, so as to provide substantial overlapping areas of the cusps when they are in their closed positions, shown in FIGURES 3 and 4. The arcuate lobe edges 19 smoothly merge with the arcuate notches 23, so that the arcuate edge 19 of each cusp slides along the arcuate edge of the notch 23 of the mating cusp when the cusps are flexed upwardly and downwardly in moving between the positions of FIGURES 1 and 3.

During the movement of the cusps, the vertices 22 describe symmetrical arcuate paths, shown at 26, 26 in dotted view in FIGURE 1, said vertices substantially coinciding in position at the extreme ends of their travel. Thus, the lobes 17, 17 of the cusps interlock at the uppermost positions of the cusps, shown in FIGURE 1 limiting further upward flexure of the cusps.

It will be apparent that in the closed position, each of the cusps participates in supporting the other cusp, thus strengthening the valve in its closed position because of the interlocking of the cusps. The opening and the closing of the valve requires relatively little deformation of the cusps and permits smooth, nearly laminar flow of blood to pass the cusps in their open position, reducing the chance of blood clotting (thrombus formation).

In the specific valve illustrated in the drawings, the amount of overlap of the cusps in closed position is approximately 30°. This overlap can be varied, in designs according to the present invention, from 0° to 180°.

In the side view of FIGURE 3, the angle of the cone is shown as 24°. This angle can be varied, in designs according to the present invention, from 0° to 30° and more. At 0° the amount of opening would be very small, since the vertices (centers) 22 would tend to lock with each other.

When the cone angle is 24°, the open valve cusps present angles of approximately 18° from the vertical. When the cone angle is made 30°, the upper portion of each of the two open cusps would be substantially vertical, presenting an angle of substantially 0° to the direction of blood flow through the valve.

The attachment tabs 16' may be made of any desired length or width.

The valve may be sewn into position with silk thread. The marginal ring 13 may comprise a suitable plastic material into which tissue will grow, for example, four-to-one compressed polyvinyl sponge material.

While a specific embodiment of an improved valve has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A valve comprising a substantially annular seat, a pair of cooperating flap members, and means to secure the ends of said flap members to opposite portions of said seat, said flap members being of substantially identical shape, each flap member comprising a main body having an arcuate outer peripheral edge and formed with a transversely extending lobe at its free end and with a smoothly curved notch extending from said lobe to the secured end of the flap member, the flap members overlapping each other with the lobe of each flap member overlying the notched portion of the other flap member when the valve is in closed position, the flap members being flexible in at least one direction to allow the lobes to move away from said notched portions, the inner peripheral edge of each flap member being substantially slidable along the inner peripheral edge of the other flap member as the flop members are flexed to open positions.

2. The structure of claim 1, and wherein the lobes have substantially semi-circular peripheral edges.

3. The structure of claim 1, and wherein the flap members are formed on a common conical surface.

4. The structure of claim 3, and wherein the generating elements of said conical surface are inclined at an angle between 0° and 30° to the base of the conical surface.

5. The structure of claim 1, and wherein the angle of overlap of the flap members in closed position is between 0° and 180°.

6. The structure of claim 3, and wherein the flap members include vertices of said conical surface which engage each other in the fully closed and fully opened positions of the flap members.

7. The structure of claim 1, and wherein the flap members are substantially rigid except adjacent their secured ends.

8. The structure of claim 1, and wherein said seat has a frusto-conical surface subjacent the flap members located to support the outer peripheral portions of the flap members in their closed positions.

9. The structure of claim 4, and wherein said angle is approximately 24°.

10. The structure of claim 1, and wherein said arcuate outer peripheral edge is generally semi-circular in shape.

References Cited in the file of this patent
UNITED STATES PATENTS

| | | |
|---|---|---|
| 2,682,057 | Lord | June 29, 1954 |
| 2,822,819 | Geeraert | Feb. 11, 1958 |
| 2,832,078 | Williams | Apr. 29, 1958 |